United States Patent
Smith (12)

(10) Patent No.: US 6,948,807 B1
(45) Date of Patent: Sep. 27, 2005

(54) HORIZONTALLY COMBINABLE EYEWEAR ASSEMBLY

(75) Inventor: Greg Smith, Plano, TX (US)

(73) Assignee: E'Lite Optik, Inc., Carrollton, TX (US)

( * ) Notice: Subject to any disclaimer, the term of this patent is extended or adjusted under 35 U.S.C. 154(b) by 0 days.

(21) Appl. No.: 10/932,691

(22) Filed: Sep. 2, 2004

(51) Int. Cl.$^7$ .............................................. G02C 9/00
(52) U.S. Cl. ........................................ 351/47; 351/57
(58) Field of Search ............................ 351/47, 48, 57, 351/58, 44, 41, 158

(56) References Cited

U.S. PATENT DOCUMENTS

| | | | |
|---|---|---|---|
| 3,238,005 A | 3/1966 | Petitto | |
| 3,252,747 A | 5/1966 | Robins | |
| 4,070,103 A | 1/1978 | Meeker | |
| 5,376,977 A | 12/1994 | Liu | |
| 5,416,537 A | 5/1995 | Sadler | |
| 5,568,207 A | 10/1996 | Chao | |
| 5,737,054 A | 4/1998 | Chao | |
| 6,089,708 A | 7/2000 | Ku | |
| 6,474,811 B2 | 11/2002 | Liu | |
| 6,601,953 B1 | 8/2003 | Xiao | |
| 6,702,439 B1 * | 3/2004 | Lee | 351/47 |
| 6,848,784 B1 * | 2/2005 | Park | 351/47 |

\* cited by examiner

*Primary Examiner*—Hung Xuan Dang

(57) ABSTRACT

The present invention relates to eyewear, and in particular, to a design for a primary lens assembly combinable with a secondary lens assembly. The primary lens assembly has a slotted extension design. The auxiliary lens assembly has extensions insertable into the slots of the primary extensions. The auxiliary lens assembly is horizontally insertable into the primary lens assembly. The primary and/or auxiliary lens assemblies may have magnets. Alternatively, the primary and/or auxiliary lens assemblies may have compressible bushings to permit an interference fit of the assemblies. The design permits easier attachment and prohibits undesired disengagement of auxiliary lens assembly from primary frame assembly.

12 Claims, 7 Drawing Sheets

HORIZONTALLY COMBINABLE EYEWEAR ASSEMBLY

TECHNICAL FIELD OF INVENTION

The present invention relates to eyewear, and in particular, to a novel design for a horizontally combinable eyewear assembly. More specifically, the invention relates to a primary lens assembly capable of attachment to an auxiliary lens assembly with a simplified horizontal connection, while providing a unique and desirable appearance, this resists unintended disengagement.

BACKGROUND OF THE INVENTION

It has long been desirable to have a removable auxiliary lens assembly attached to eyeglasses. Professional baseball players have used "flip-up" auxiliary lenses for more than four decades to protect their eyes from the sun, but to allow them unrestricted vision in the event the ball was hit in their vicinity.

U.S. Pat. No. 3,252,747 to Robins discloses an eyewear system specifically designed for persons who are far sighted. The device includes an assembly in which an auxiliary frame assembly containing lenses may be rotated about the horizontal axis and remains attached to a primary assembly so as to locate the lenses the proper distance to the eyes every time the device is lowered into place. A significant disadvantage of this design is that it is unattractive, overly complicated, impossible to segregate from the primary frame, and does not permit or accommodate anyone other than far sighted individuals.

U.S. Pat. No. 6,089,708 to Ku discloses a connecting member having spaced connecting plates for attachment to the bridge portion of a primary lens assembly. The connecting plates have magnetic members that act cooperatively with a complimentary magnetic member inserted in a hole on the bridge. The front of the connecting part has an open communication to a polygonal shaped holding room. The auxiliary frame has connecting rods extending above the bridge portion, and supporting an intermediate portion having a polygonal shape, receivable and rotatable in the holding room. A significant disadvantage of this design is that it is unattractive, overly complicated, and resist easy and immediate removal of the auxiliary lens assembly.

U.S. Pat. No. 3,238,005 to Petitto discloses the combination of a primary lens assembly and auxiliary lens assembly. The auxiliary assembly has flexible side wall projections with openings that can be assembled onto lugs (pins) extending perpendicularly from the sides of the primary assembly, allowing the auxiliary assembly to be pivoted upwards, and back downwards. Leaf springs mounted on the auxiliary assembly engage surfaces of the primary assembly to urge the auxiliary assembly into position. A significant disadvantage of this design is that it is unattractive, overly complicated, and resist easy and immediate removal of the auxiliary lens assembly.

As stated, these and other mechanically clipped on devices for holding auxiliary lenses are cumbersome and unattractive. More recently, numerous attempts have been made to magnetically attach an auxiliary lens assembly to a primary lens assembly.

U.S. Pat. No. 5,416,537 to Sadler discloses a primary lens assembly having a first magnetic member attached vertically to the front surface of the primary lens assembly, and a second magnetic member attached in a corresponding position on the back surface on an auxiliary lens assembly. The magnetic members are arranged for engagement to attach the auxiliary lens assembly to the primary lens assembly. A disadvantage of this design is that it is unattractive, and fails to prevent disengagement when vertically jarred, as may occur when stepping off a curb, jumping, or jogging.

U.S. Pat. No. 5,568,207 to Chao also discloses a magnetically adhered auxiliary lens assembly, with the additional feature of arms extending from the side portions of the auxiliary lens assembly, over magnet retaining projections and extensions of the primary lens assembly. The arms engage with, and are supported on, the primary lens assembly extensions to prevent disengagement of the auxiliary lens assembly upon downward movement of the auxiliary lens assembly relative to the primary lens assembly.

A disadvantage of this design is that it requires at least some specific vertical path movement for lowering the auxiliary lens assembly into a precise positional alignment with a capture mechanism for securing the auxiliary lens assembly to the primary lens assembly. As a result, positioning and removal of the auxiliary lens assembly against the primary lens assembly is difficult, cumbersome, and inconvenient. Additionally, it relies of thin metal extension components from the auxiliary lens assembly.

It can thus be seen that there is a need to develop a design for a primary lens assembly in which the primary frame assembly can be adapted to accept an improved and simplified attachment of a complementary configured auxiliary lens assembly.

SUMMARY OF THE INVENTION

A primary advantage of the present invention is that it provides a primary lens assembly that is adapted to receive a complimentary auxiliary lens assembly, with a simplified attachment motion. Another advantage of the present invention is that it provides a secure structure that improves the resistance of the auxiliary lens assembly from unintended detachment resulting from vertically imparted force. Another advantage of the present invention is that it is simple, unique, and aesthetically attractive.

Other advantages of the present invention will become apparent from the following descriptions, taken in connection with the accompanying drawings, wherein, by way of illustration and example, an embodiment of the present invention is disclosed. As referred to hereinabove, the "present invention" refers to one or more embodiments of the present invention which may or may not be claimed, and such references are not intended to limit the language of the claims, or to be used to construe the claims in a limiting manner.

In accordance with one aspect of the invention, there is provided an eyewear system comprising a primary lens assembly and an attachable auxiliary lens assembly. The primary lens assembly may include a primary frame or other means for retaining a pair of primary lenses. A pair of primary extensions extends horizontally outward from the primary frame, or from the lenses themselves. Each primary extension has an upper extension portion, a lower extension portion, and a slot between the upper and lower extension portions.

The auxiliary lens assembly may include a primary frame or other means for retaining a pair of auxiliary lenses. A pair of auxiliary extensions extends horizontally outward from the auxiliary frame, or from the lenses themselves. The auxiliary extensions are horizontally insertable into the slots of the primary extensions. In the preferred embodiment, magnets and/or magnetic materials are combined to create a magnetic engagement between the primary lens assembly and the secondary lens assembly.

In an alternative embodiment, the auxiliary extensions are horizontally insertable into the slots of the primary extensions for engagement by interference fit. In this embodiment, compressible bushings are preferably located in the auxiliary retainers of the auxiliary extensions. The height of the bushing is greater than the height of the slot in the primary extensions, creating an interference fit when the auxiliary lens assembly is attached to the primary lens assembly.

As described, the auxiliary lens assembly may be attached to the primary lens assembly. In this manner, the person wearing the eyewear system has two lenses combining to alter the transmission of light to each eye.

In a preferred embodiment, the primary lenses are corrective lenses and the auxiliary lenses are light transmission reducing lenses, for example, a polarizing, absorbing, refracting, photochromatic, or reflecting lenses, or any combination thereof (i.e., sunglasses). In a preferred embodiment, the primary lenses are impact resistant safety lenses and the auxiliary lenses are light transmission reducing lenses, such as welding lenses. In another preferred embodiment, the primary lenses are corrective lenses and the auxiliary lenses are corrective lenses. In another preferred embodiment, the primary lenses are corrective lenses and the auxiliary lenses are impact resistant safety lenses.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The terms "right" and "left" as used herein are referenced from the perspective of a person wearing the primary and auxiliary lens assemblies. The references are intended to aide in the description of the device, and are not intended to be limiting, since the preferred embodiments of the device are generally symmetric.

Figure 1:
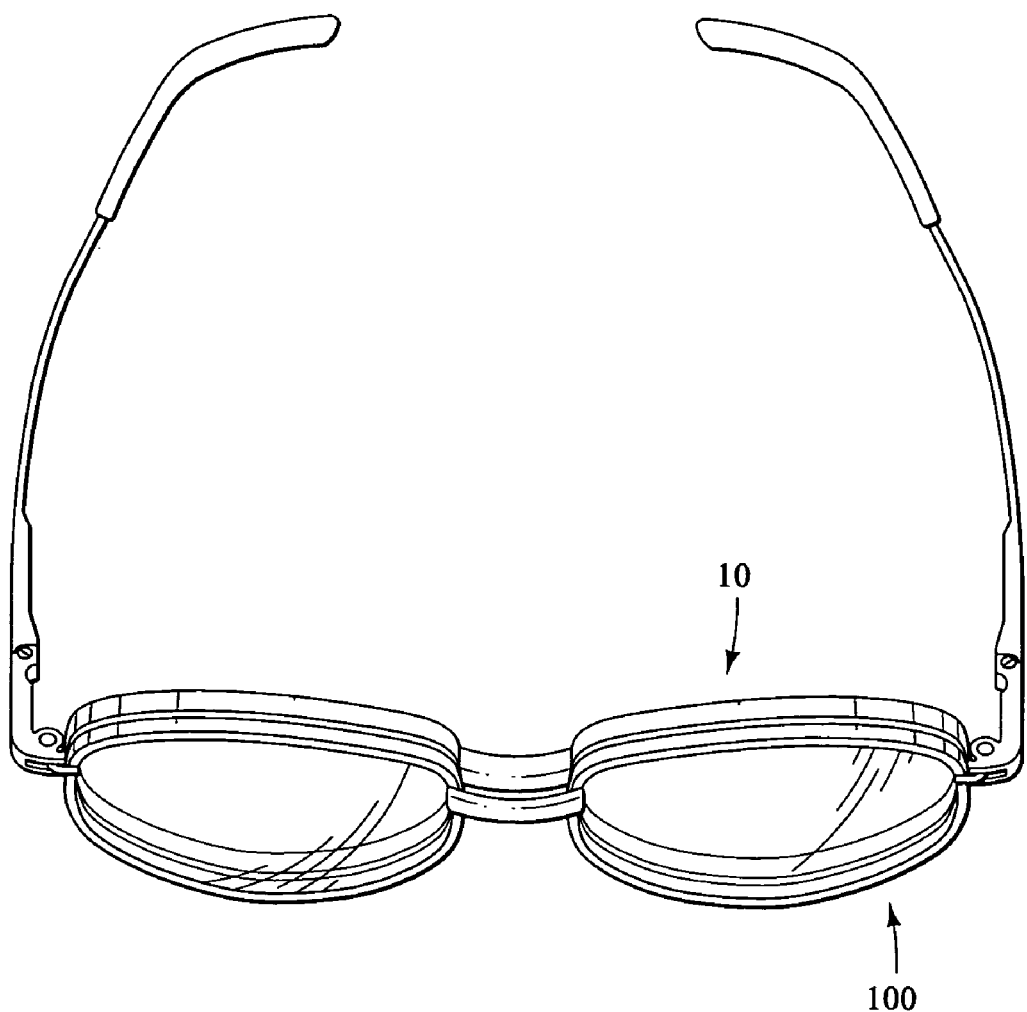
FIG. 1 is an isometric view of a primary lens assembly having an auxiliary lens assembly attached in accordance with a preferred embodiment of the present invention.

FIG. 1 is an isometric view of a preferred embodiment of the present invention. In this view, a primary lens assembly 10 is illustrated in accordance with a preferred embodiment of the present invention. An auxiliary lens assembly 100 is also illustrated in accordance with a preferred embodiment of the present invention. In FIG. 1, auxiliary lens assembly 100 is illustrated attached to primary lens assembly 10.

Figure 2:
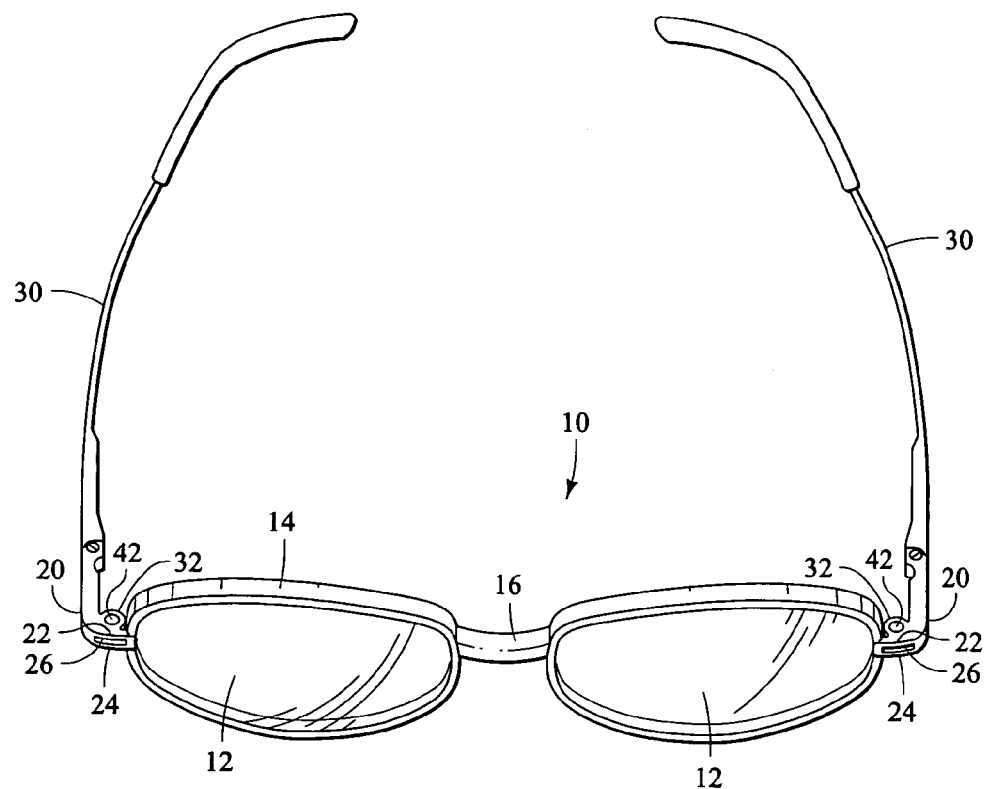
FIG. 2 is an isometric view of the primary lens assembly in accordance with the preferred embodiment of the present invention.

FIG. 2 is an isometric view of the primary lens assembly 10. From this view, it is seen that primary lens assembly 10 has a pair of lenses 12. In the embodiment shown, lenses 12 are secured in place by a primary frame 14. A bridge portion 16 connects the left and right sides of primary frame 14 for positioning lenses 12 relative to each other, and for supporting primary lens assembly 10 on the face of the person wearing primary lens assembly 10. A primary extension 20 extends horizontally outward from each side of primary frame 14. Each primary extension 20 is comprised of an upper extension portion 22 and a lower extension portion 24. A slot 26 is formed between upper extension 22 and lower extension 24. An arm 30 is pivotally connected to each primary extension 20 to permit traditional wearing of primary lens assembly 10.

Figure 3:
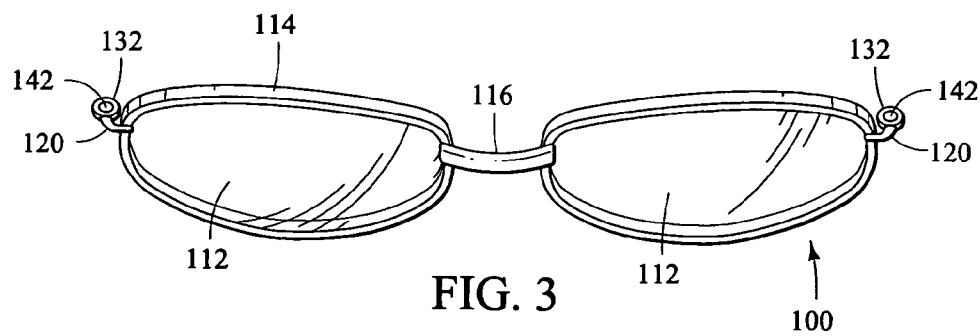
FIG. 3 is an isometric view of the auxiliary lens assembly configured for compatible connection to the preferred embodiment of the primary lens assembly disclosed in FIG. 2.

FIG. 3 is an isometric view of auxiliary lens assembly 100, configured for compatible connection to the preferred embodiment of primary lens assembly 10 disclosed in FIG. 2. As seen in FIG. 3, auxiliary lens assembly 100 has a pair of lenses 112. In the embodiment shown, lenses 112 are secured in place by an auxiliary frame 114. A bridge portion 116 connects the left and right sides of auxiliary frame 114 for positioning lenses 112 relative to each other. An auxiliary extension 120 extends horizontally outward from each side of auxiliary frame 114. Auxiliary extensions 120 are horizontally insertable into slots 26 of primary extensions 20 of primary lens assembly 10.

Figure 4:
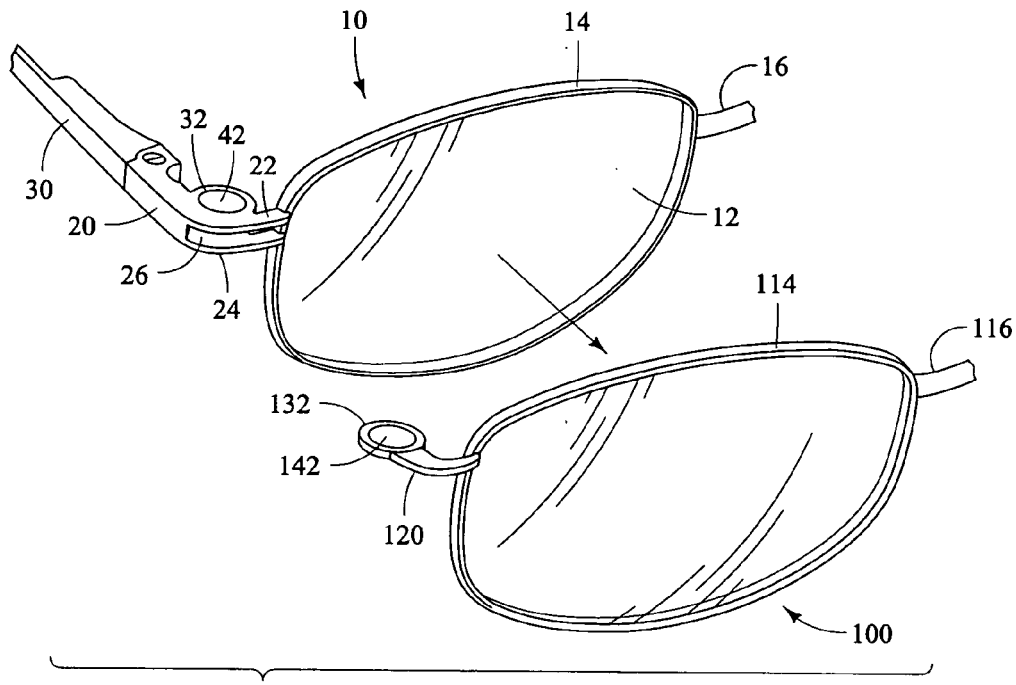
FIG. 4 is an isometric break-out view illustrating the auxiliary lens assembly disengaged from the primary lens assembly, where the primary and auxiliary extensions contain magnets.

FIG. 4 is an isometric break-out view illustrating auxiliary lens assembly 100 disengaged from primary lens assembly 10. As best seen in this view, upper extension 22 and lower extension portion 24 are joined at primary frame 14 on lens 12 side of slot 26. Alternatively, upper extension 22 and lower extension portion 24 are joined at primary extension 20 on the primary frame 14 side of slot 26. In the preferred embodiment, upper extension 22 and lower extension 24 are also joined at extension 20 on arm 30 side of slot 26.

In the preferred embodiment illustrated in FIG. 4, upper extension 22 has an upper retainer 32. An upper magnet 42 is secured in upper retainer 32. Upper magnet 42 need not be round, and upper retainer 32 merely describes the material surrounding upper magnet 42 on upper extension 22.

Figure 11:
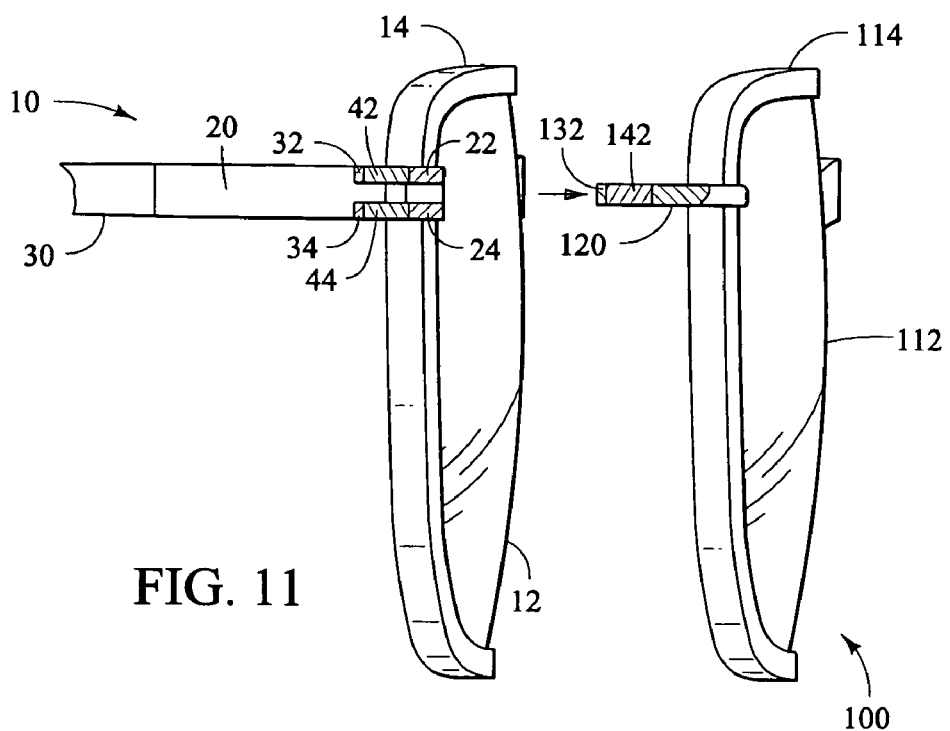
FIG. 11 is a side sectional view of the preferred embodiment disclosed in FIG. 10, illustrating the auxiliary lens assembly removed from the primary lens assembly in forward directional movement.

Also in the preferred embodiment, lower extension 24 has a lower retainer 34. A lower magnet 44 is secured in lower retainer 34. This is best seen in FIG. 11. FIG. 11 is a side sectional view of the preferred embodiment disclosed in FIGS. 1–4, illustrating the mechanical and magnetic engagement of primary lens assembly 10 to auxiliary lens assembly 100. Lower magnet 44 need not be round, and lower retainer 34 merely describes the material surrounding lower magnet 44 on lower extension 24.

Referring back to FIG. 4, auxiliary lens assembly 100 is designed to be compatible with primary lens assembly 10. Auxiliary extensions 120 extend horizontally outward and rearward from auxiliary frame 114. In the preferred embodiment illustrated FIG. 4, auxiliary extensions 120 have an auxiliary retainer 132. Auxiliary magnets 142 are secured in auxiliary retainers 132. Auxiliary retainers 132 need not be round, and need not describe more than the material surrounding a cavity in auxiliary extension 120. In an alternative embodiment, auxiliary magnets 142 are secured directly in auxiliary extensions 120.

Figure 10:
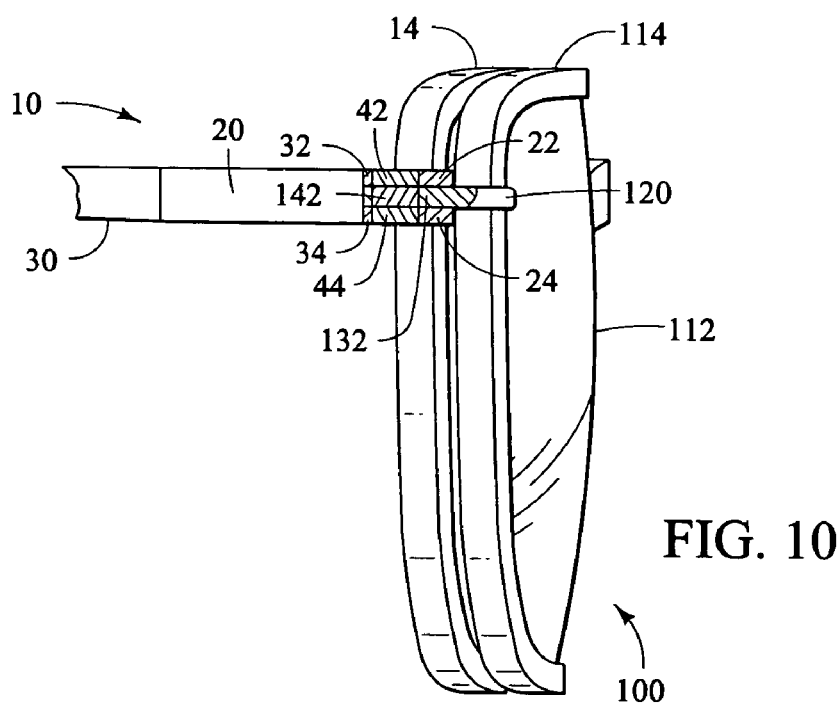
FIG. 10 is a side sectional view of the primary lens assembly disclosed in FIG. 2 attached to the auxiliary lens assembly disclosed in FIG. 3, as also disclosed in FIGS. 4, 7, 8 and 9, illustrating the mechanical and magnetic engagement of the primary lens assembly to the auxiliary lens assembly.

Referring to FIG. 4 and to FIGS. 10 and 11, it is seen that auxiliary extensions 120 are horizontally insertable into slots 26 of primary extensions 20 for magnetic engagement between upper magnets 42 and auxiliary magnets 142, and between lower magnets 44 and auxiliary magnets 142.

Figure 5:
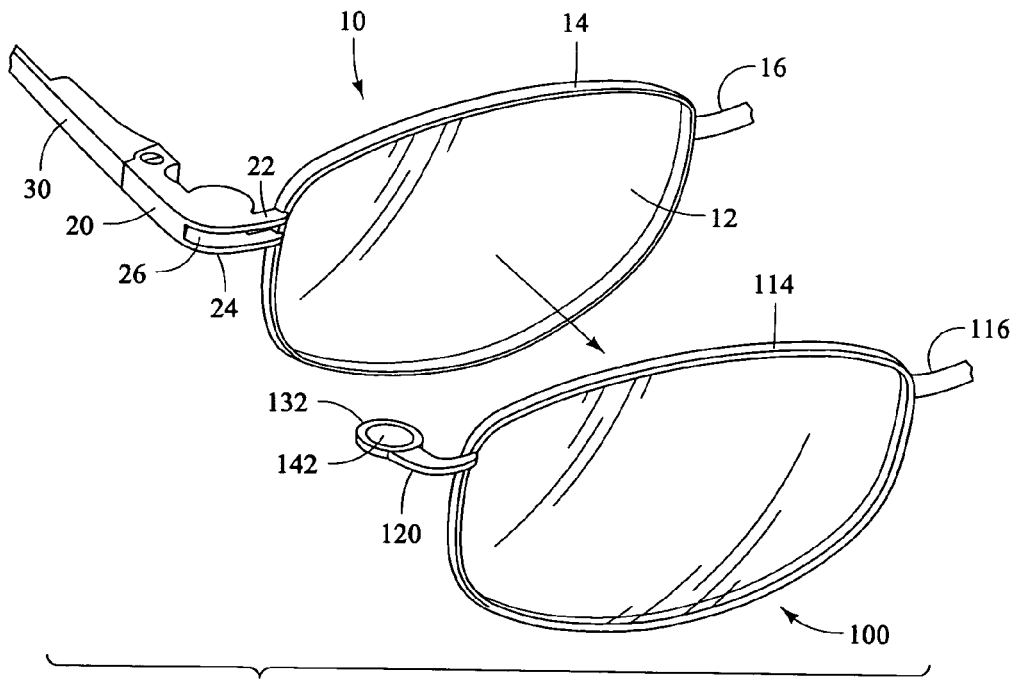
FIG. 5 is an isometric break-out view illustrating the auxiliary lens assembly disengaged from the primary lens assembly in an alternative embodiment where the primary extensions are made of a magnetic material and the auxiliary extensions contain magnets.

FIG. 5 is an isometric break-out view illustrating auxiliary lens assembly 100 disengaged from primary lens assembly 10 in an alternative embodiment in which upper extensions 22, and/or lower extensions 24, and/or primary extensions 20 are made of a magnetic material. As used herein, "magnetic material" is defined as a material subject to magnetic force in the presence of a magnetic field, such as may be provided by a magnet. Thus, "magnetic material" includes, for example, ferromagnetic materials.

In the embodiment disclosed in FIG. 5, magnetic engagement between primary lens assembly 10 and auxiliary lens assembly 100 is achieved by magnetic engagement of extensions 20 of primary lens assembly 10 to auxiliary magnets 142 of auxiliary lens assembly 100.

In a similar embodiment (not shown) magnetic engagement between primary lens assembly 10 and auxiliary lens assembly 100 is achieved by magnetic engagement of upper magnets 42 of extensions 20 of primary lens assembly 10 to auxiliary extensions 120, which are made of magnetic material. In another similar embodiment (not shown) magnetic engagement between primary lens assembly 10 and auxiliary lens assembly 100 is achieved by magnetic engagement of lower magnets 44 of extensions 20 of primary lens assembly 10 to auxiliary extensions 120, which are made of magnetic material.

It will thus be recognized by one of ordinary skill in the art that combinations of magnets and magnetic materials located in the same general location and orientation can be utilized to obtain the disclosed result without departing from the spirit or teaching of the present invention.

Figure 6:
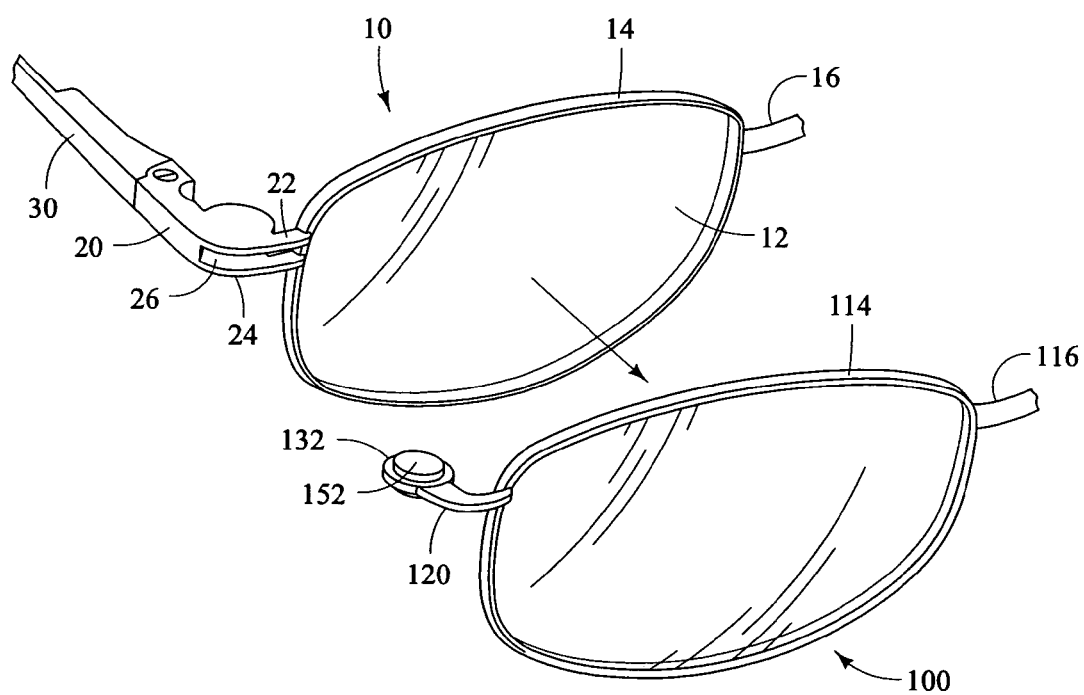
FIG. 6 is an isometric break-out view illustrating the auxiliary lens assembly disengaged from the primary lens assembly in another alternative embodiment where the auxiliary extensions contain compressible bushings for interference fit within the slots of the primary extensions.

FIG. 6 is an isometric break-out view illustrating auxiliary lens assembly 100 disengaged from primary lens assembly 10 in an alternative embodiment where the engagement between primary lens assembly 10 and auxiliary lens assembly 100 is achieved by inference fit of a compressible material within slot 26. In this embodiment, no magnets are necessary. Auxiliary extensions 120 of auxiliary lens assembly 100 have compressible bushings 152 located in auxiliary retainers 132. Compressible bushings 152 provide a compressible material for achieving an interference fit within slots 26 of primary extensions 20.

Figure 12:
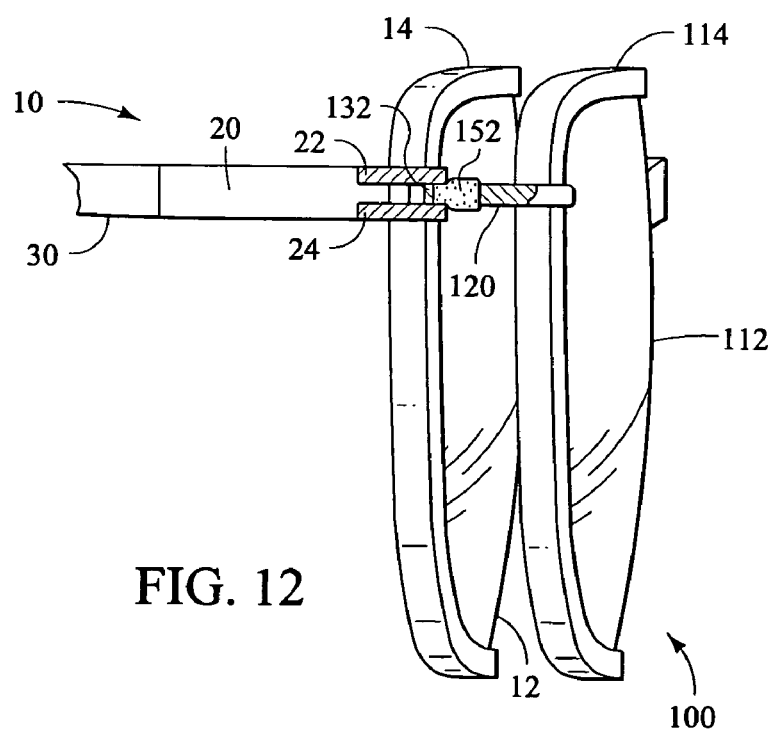
FIG. 12 is a side sectional view of the alternative embodiment disclosed in FIG. 6, illustrating the auxiliary lens assembly partially engaged with the primary lens assembly showing the compressibility of the bushing during interference fit within the slots of the primary extensions of the primary lens assembly.

The compression of bushings 152 within slots 26 is best seen in FIG. 12. FIG. 12 is a side sectional view of the alternative embodiment disclosed in FIG. 6, illustrating auxiliary lens assembly 100 partially engaged with primary lens assembly 10, showing the compressibility of bushings 152 during interference fit within slots 26.

Although only one side of primary lens assembly 10 and auxiliary lens assembly 100 are illustrated in FIGS. 4, 5, 6, 10, 11, and 12, the opposite side is similarly configured.

Figure 7:
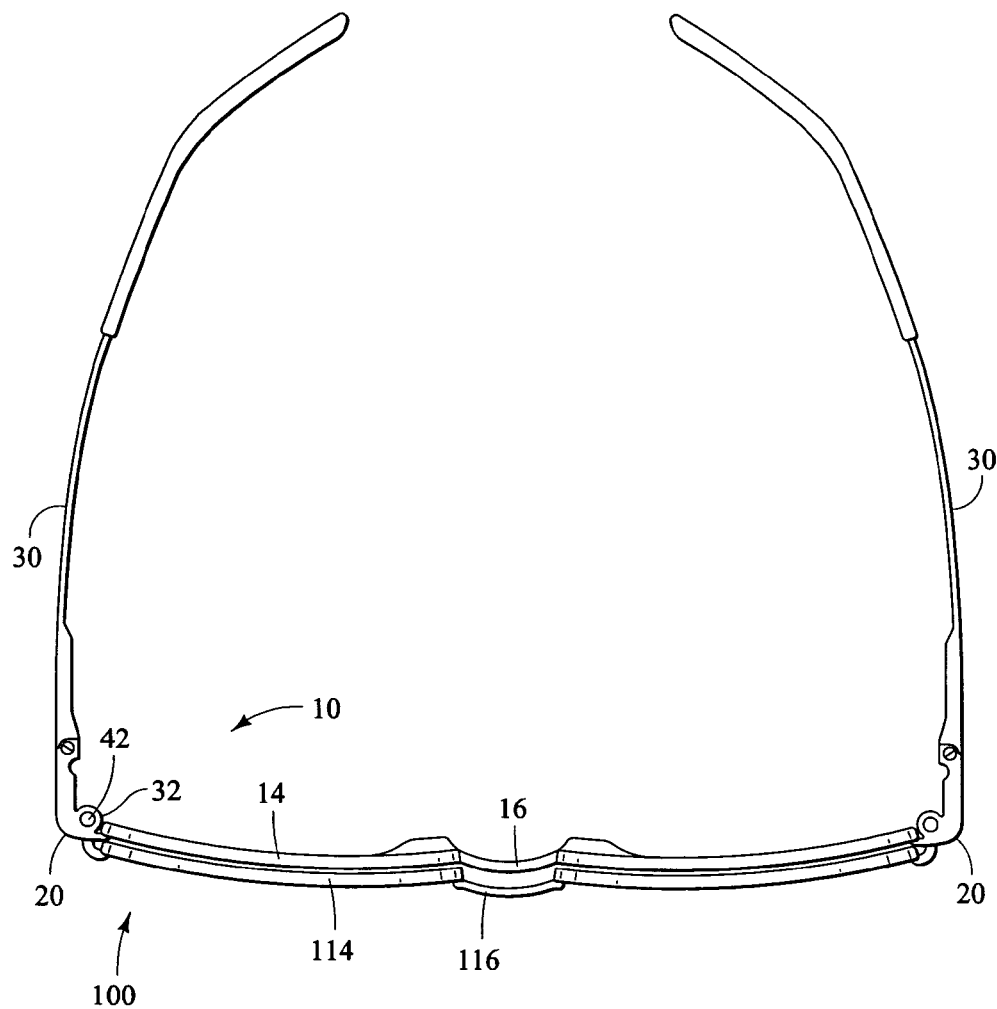
FIG. 7 is a top view of the primary lens assembly disclosed in FIG. 2 attached to the auxiliary lens assembly disclosed in FIG. 3, as also disclosed in FIG. 1.
Figure 8:
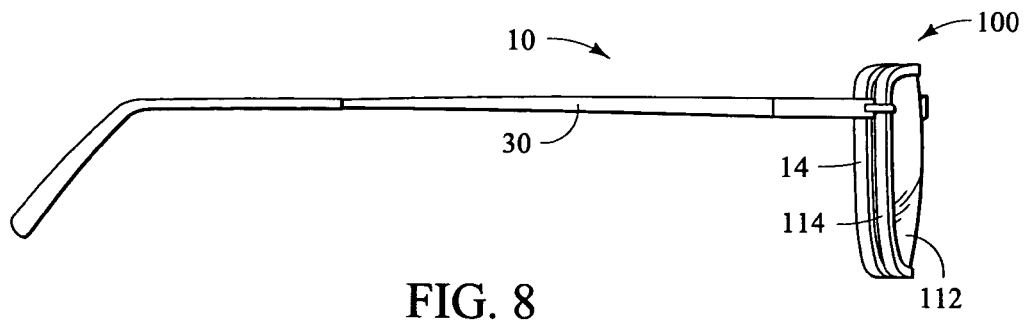
FIG. 8 is a side view of the preferred embodiment of the primary and auxiliary lens assemblies in combination as disclosed in FIG. 1 and FIG. 7.
Figure 9:
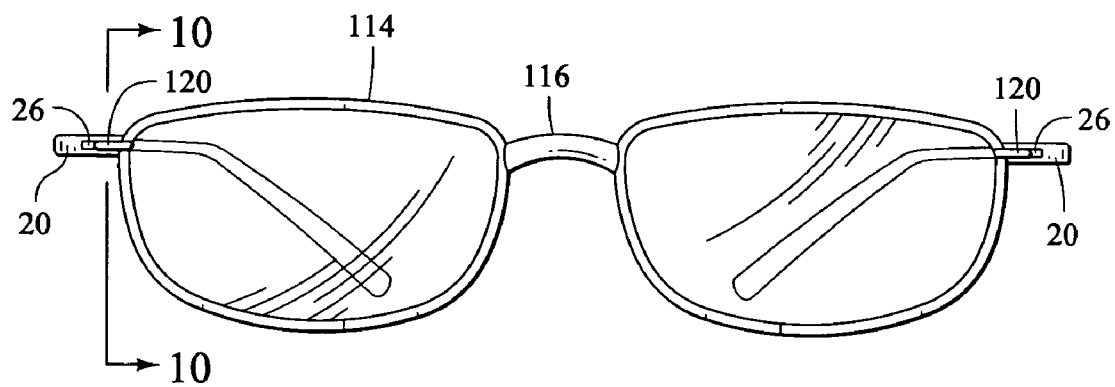
FIG. 9 is a front view of preferred embodiment of the primary and auxiliary lens assembly combination disclosed in FIGS. 1, 7, and 8.

FIG. 7, FIG. 8, and FIG. 9 illustrate top, side, and front views respectively, of primary lens assembly 100 (as disclosed in FIG. 2) attached to auxiliary lens assembly 100 (as disclosed in FIG. 3).

FIG. 10 is a side sectional view of the preferred embodiment illustrating the mechanical and magnetic engagement of primary lens assembly 10 to the auxiliary lens assembly 100. FIG. 11 is a side sectional view of the preferred embodiment disclosed in FIG. 10, illustrating auxiliary lens assembly 100 removed from primary lens assembly 10 in a direct forward directional movement.

The preferred embodiments of primary frame 10 and auxiliary frame 100 illustrate and disclose a primary frame 14 and an auxiliary frame 114 which surround the entire perimeter of primary lenses 12 and auxiliary lenses 112 respectively. Alternatively, primary frame 10 may only partially surround the perimeter of primary lenses 12. Likewise, auxiliary frame 100 may only partially surround the entire perimeter of auxiliary lenses 112. Such configurations are known in the industry as "open edge."

In another preferred embodiment, primary lenses 12 are attached directly to primary bridge 16. In this embodiment, primary extensions 20 are attached directly to primary lenses 12 as well. In another preferred embodiment, auxiliary lenses 112 are attached directly to auxiliary bridge 116. In this embodiment, auxiliary extensions 120 are attached directly to auxiliary lenses 112. Such configurations are known in the industry as "frameless."

OPERATION OF THE PREFERRED EMBODIMENTS

Auxiliary lens assembly 100 may be attached directly to primary lens assembly 10 by horizontally attaching auxiliary lens assembly 100 onto primary lens assembly 10 such that auxiliary extensions 120 slide into slots 26 on primary lens assembly 10. Advantageously, this requires only horizontal movement of auxiliary lens assembly.

Referring to FIGS. 10 and 11, a preferred embodiment of primary frame assembly 10 of the present invention is illustrated. In this embodiment, upper extension portions 22 have a retainer 32 which secures an upper magnet 42. Lower extension portions 24 have a retainer 34 which secures a lower magnet 44. Also in this embodiment, auxiliary extensions 120 each have a retainer 130 for securing an auxiliary magnet 140. When auxiliary lens assembly 100 is secured to primary frame assembly 10, magnets 42 and 44 engage auxiliary magnet 142 to provide a strong magnetic engagement, which prohibits undesired disengagement of auxiliary lens assembly 100 from primary frame assembly 10.

It is seen by the description and the illustrations that use of the present invention significantly reduces the difficulty of aligning primary lens assembly 10 with auxiliary lens assembly 100 when combining the two. It is further seen that when engaged, the location of auxiliary extensions 120 and/or retainer 130 and auxiliary magnets 140 in slots 26 of primary lens assembly 10 is mechanically resistant to unintended disengagement resulting from vertical acceleration or impact force.

In an alternative embodiment illustrated in FIG. 6, magnets are not required in either primary lens assembly 10 or auxiliary lens assembly 100. In this embodiment, interference between compressible bushings 152 and horizontal slots 26 of primary extensions 20 secures auxiliary lens assembly 100 to primary lens assembly 10.

FIG. 12 is a side sectional view of the alternative embodiment disclosed in FIG. 6, illustrating auxiliary lens assembly 100 partially engaged with primary lens assembly 10, showing the compressibility of bushings 152 during interference fit within slots 26. Interference between compressible bushings 152 and extensions 20 of primary extension 20, and/or interference between retainers 132 and extensions 20, limits vertical movement of auxiliary lens assembly 100 and is mechanically resistant to unintended disengagement resulting from vertical acceleration or impact forces.

It will be readily apparent to those skilled in the art, and the general principles defined herein may be applied to other embodiments and applications without departing from the spirit and scope of the present invention.

I claim:

1. An eyewear system comprising:
    a primary lens assembly comprising;
    a primary frame for retaining a pair of primary lenses;
    a pair of primary extensions extending horizontally outward from the primary frame, each having an upper extension portion, a lower extension portion, and a slot between the upper and lower extension portions, and,
    an auxiliary lens assembly comprising;
    an auxiliary frame for retaining a pair of auxiliary lenses; and,
    a pair of auxiliary extensions extending horizontally outward from the auxiliary frame; and,
    whereas the auxiliary extensions are horizontally insertable into the slots of the primary extensions for magnetic engagement.

2. The eyewear system of claim 1, further comprising:
    a primary magnet located in each upper extension portion.

3. The eyewear system of claim 1, further comprising:
    an auxiliary magnet located in each auxiliary extension.

4. The eyewear system of claim 1, further comprising:
    a primary magnet located in each lower extension portion.

5. The eyewear system of claim 1, wherein the auxiliary extensions are made of a magnetic material.

6. The eyewear system of claim 1, wherein the upper extension portions are made of a magnetic material.

7. The eyewear system of claim 1, wherein the lower extension portions are made of a magnetic material.

8. An eyewear system comprising:
    a primary lens assembly comprising;
    a primary frame for retaining a pair of primary lenses;
    a pair of primary extensions extending horizontally outward from the primary frame, each having an upper extension portion, a lower extension portion, and a slot between the upper and lower extension portions, and,
    an auxiliary lens assembly comprising;
    an auxiliary frame for retaining a pair of auxiliary lenses; and,
    a pair of auxiliary extensions extending horizontally outward from the auxiliary frame; and,
    whereas the auxiliary extensions are horizontally insertable into the slots of the primary extensions in an interference fit relationship.

9. The eyewear system of claim 8, further comprising:
    a compressible bushing located in each upper extension portion.

10. The eyewear system of claim 8, further comprising:
    a compressible bushing located in each lower extension portion.

11. The eyewear system of claim 8, further comprising:
    a compressible bushing located in each auxiliary extension.

12. An eyewear system comprising:
    a primary lens assembly comprising;
    a pair of primary lenses;
    a pair of primary extensions extending horizontally outward from the primary lenses, each having an upper extension portion, a lower extension portion, and a slot between the upper and lower extension portions, and,
    an auxiliary lens assembly comprising;
    a pair of auxiliary lenses; and,
    a pair of auxiliary extensions extending horizontally outward from the auxiliary lenses; and,
    whereas the auxiliary extensions are horizontally insertable into the slots of the primary extensions for magnetic engagement.

* * * * *

UNITED STATES PATENT AND TRADEMARK OFFICE
CERTIFICATE OF CORRECTION

PATENT NO. : 6,948,807 B1
DATED : September 27, 2005
INVENTOR(S) : Greg Smith

It is certified that error appears in the above-identified patent and that said Letters Patent is hereby corrected as shown below:

<u>Title page,</u>
Insert Item: -- [74] *Attorney, Agent, or Firm–* John G. Fischer; STORM LLP --.

Signed and Sealed this

Seventh Day of March, 2006

JON W. DUDAS
*Director of the United States Patent and Trademark Office*